United States Patent
Laszlo

(10) Patent No.: US 9,376,139 B2
(45) Date of Patent: Jun. 28, 2016

(54) BALL SCREW HAVING BEARING COMPENSATION

(71) Applicant: ThyssenKrupp Presta AG, Eschen (LI)

(72) Inventor: Gergely Laszlo, Esslingen-Berkheim (DE)

(73) Assignee: ThyssenKrupp Presta AG, Eschen (LI)

( * ) Notice: Subject to any disclaimer, the term of this patent is extended or adjusted under 35 U.S.C. 154(b) by 99 days.

(21) Appl. No.: 14/355,088

(22) PCT Filed: Nov. 7, 2012

(86) PCT No.: PCT/EP2012/004628
§ 371 (c)(1),
(2) Date: Feb. 4, 2015

(87) PCT Pub. No.: WO2013/068104
PCT Pub. Date: May 16, 2013

(65) Prior Publication Data
US 2015/0217800 A1    Aug. 6, 2015

(30) Foreign Application Priority Data
Nov. 7, 2011 (DE) .......................... 10 2011 117 723

(51) Int. Cl.
*F16H 25/24* (2006.01)
*B62D 5/04* (2006.01)
*F16H 25/22* (2006.01)
(Continued)

(52) U.S. Cl.
CPC ............ *B62D 5/0448* (2013.01); *B62D 5/0424* (2013.01); *F16D 3/22* (2013.01); *F16H 25/2204* (2013.01); *F16H 25/24* (2013.01); *F16C 23/08* (2013.01); *F16H 2025/2096* (2013.01); *F16H 2025/2445* (2013.01)

(58) Field of Classification Search
CPC B62D 5/0448; B62D 5/0424; F16H 25/2204; F16C 23/08; Y10T 74/18576; Y10T 74/1868
See application file for complete search history.

(56) References Cited

U.S. PATENT DOCUMENTS

| 8,777,760 B2 * | 7/2014 | Varnoux | F16D 7/021 464/41 |
| 2004/0235599 A1 * | 11/2004 | Ozorak | F16C 13/006 474/199 |

(Continued)

FOREIGN PATENT DOCUMENTS

| DE | 102009020554 A1 | 11/2010 |
| DE | 102010003233 A1 | 9/2011 |

(Continued)

OTHER PUBLICATIONS

International Preliminary Report on Patentability and Written Opinion issued in PCT International Patent Application No. PCT/EP2012/004628, dated May 13, 2014.

(Continued)

*Primary Examiner* — David M Fenstermacher
(74) *Attorney, Agent, or Firm* — Panitch Schwarze Belisario & Nadel LLP

(57) ABSTRACT

The invention relates to a ball screw (20) comprising a ball nut (21), a roller bearing (22) and a belt pulley (23) arranged on the roller bearing (22). The ball nut (21) is arranged in the roller bearing (22) such that there is no reduction in tension between that of the belt pulley (23) and an assisting engine arranged to the side of the ball screw (20).

14 Claims, 5 Drawing Sheets

Figure 1:
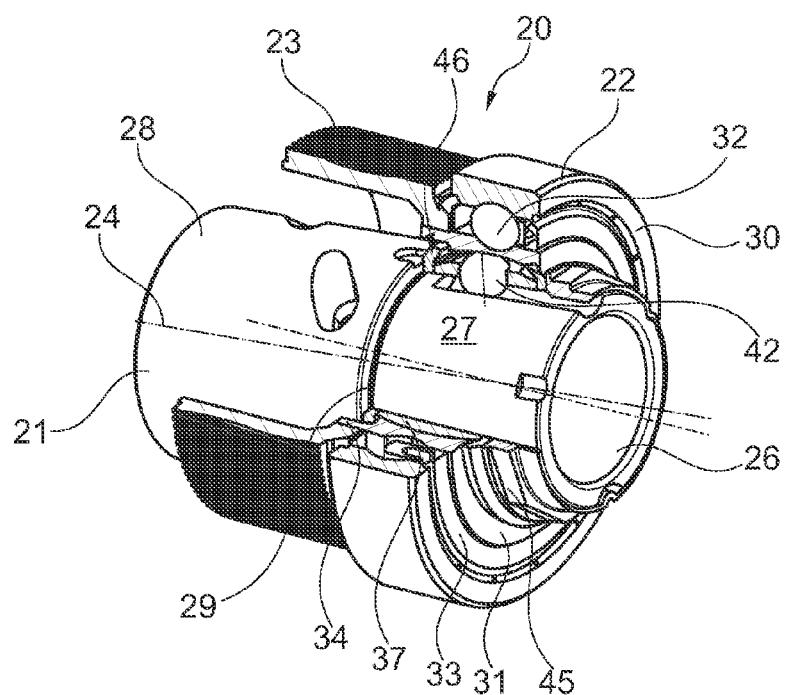

(51) Int. Cl.
*F16D 3/22* (2006.01)
*F16H 25/20* (2006.01)
*F16C 23/08* (2006.01)

(56) References Cited

U.S. PATENT DOCUMENTS

| | | | | |
|---|---|---|---|---|
| 2011/0167940 | A1* | 7/2011 | Shavrnoch | B62D 5/0448 74/89.36 |
| 2012/0000446 | A1* | 1/2012 | Venton-Walters | F16D 1/101 123/564 |
| 2012/0042741 | A1* | 2/2012 | Jacob | F16H 57/0401 74/89.44 |
| 2012/0192662 | A1* | 8/2012 | Kluge | B62D 5/0448 74/89.17 |
| 2012/0199412 | A1* | 8/2012 | Kluge | B62D 5/0424 180/444 |
| 2013/0048411 | A1* | 2/2013 | Lee | B62D 5/0427 180/444 |
| 2014/0047936 | A1* | 2/2014 | Arlt | F16H 25/2204 74/89.23 |
| 2014/0238166 | A1* | 8/2014 | Jeon | B62D 3/08 74/89.23 |
| 2014/0260727 | A1* | 9/2014 | Webber | B62D 5/0424 74/89.23 |
| 2014/0260728 | A1* | 9/2014 | Holm | F16C 35/063 74/89.23 |
| 2015/0217800 | A1* | 8/2015 | Laszlo | B62D 5/0424 474/113 |
| 2015/0321690 | A1* | 11/2015 | Yamaguchi | F16H 25/2223 180/444 |
| 2016/0033017 | A1* | 2/2016 | Range | F16H 25/2003 74/89.42 |

FOREIGN PATENT DOCUMENTS

| | | |
|---|---|---|
| EP | 1350971 A2 | 10/2003 |
| WO | WO-2011015374 A1 | 2/2011 |
| WO | WO-2011154435 A1 | 12/2011 |

OTHER PUBLICATIONS

International Search Report and Written Opinion issued in PCT/EP2012/004628, date of mailing Feb. 20, 2013, with English translation of International Search Report.

* cited by examiner

BALL SCREW HAVING BEARING COMPENSATION

CROSS-REFERENCE TO RELATED APPLICATIONS

This application is a National Stage of PCT International Application No. PCT/EP2012/004628, filed on Nov. 7, 2012, and claims priority of German Patent Application No. 10 2011 117 723.3, filed on Nov. 11, 2011. The disclosures of the aforementioned applications are incorporated herein their entirety by reference.

The invention relates to a ball screw according to the preamble of independent claim 1.

Ball screws are commonly used as low-friction and virtually play-free drive mechanisms for spindles. They implement a rotational movement in a linear direction and are therefore used particularly in the steering systems of motor vehicles. To support the steering, the screw assemblies are driven electrically and/or mechanically which, in turn, causes axial displacement of the spindle.

Electromechanical, power-assisted steering systems represent simple and energy-saving alternatives, which reduce the fuel consumption of a motor vehicle and improve the drive power of the wheels. In electromechanical systems, a conventional hydraulic system is replaced by an electronically controlled electric motor. Rack and pinion gears or belt drives are used for power transmission.

In such belt systems, the assisting engine is connected to the ball screw by means of a belt, wherein the belt pulley is attached to the ball nut in a rotatably fixed manner, as is known from DE 10 2010 003 233 A1. This results in a risk of reduced tension if the ball nut tilts about its axial axis in elastically supported ball screws. Thus, the belt is uncoupled at least partially from the belt pulley or the engine which reduces the assist power provided by the engine. Furthermore, added noise is generated by the excitation of the belt caused by the reduced tension. Perhaps the most crucial aspect is the durability of the belt. The service life of belts of this type is reduced considerably if they are constantly subjected to these slight but frequent fluctuations in tension.

It is therefore an object of the invention to further develop the ball screw referred to at the beginning and to guarantee a permanent connection between the belt pulley and the assisting engine.

A device for achieving this object discloses the features of independent claim 1. A ball screw is suggested here comprising a ball nut that can be rotated about an axis to receive a threaded spindle arranged concentrically therein, wherein the ball nut is arranged at least partially in a roller bearing having an outer bearing ring and an inner bearing ring, and a belt pulley is attached to the inner bearing ring in a rotatably fixed manner, wherein the ball nut can be moved in an axial and/or a radial direction relative to the belt pulley. The disadvantages referred to at the beginning can be overcome through the radial and/or axial decoupling of the belt pulley from the ball nut and the tension of the belt drive can be maintained.

According to one advantageous development, the ball nut can be arranged in the roller bearing tilted relative to the belt pulley. As long as the belt pulley is attached to the ball nut bearing in a rotatably fixed manner, the assisting engine power is transmitted uniformly to the ball screw.

According to a further embodiment, a sliding ring can be arranged between the ball nut and the roller bearing, more particularly the inner bearing ring. The sliding ring allows a tilting movement of the ball nut relative to the roller bearing on to which the belt pulley is arranged in a rotatably fixed manner.

Advantageously, an outer peripheral surface of the inner bearing ring can be configured as concave, at least in part, and an outer peripheral surface of the sliding ring as convex, at least in part, wherein both external peripheral surfaces correspond to each other. The specific arrangement of the two surfaces of the inner bearing ring and the sliding ring turned towards each other facilitates the tilting movement of the ball nut. A curvature of the respective surface adjusts according to the tilting movement.

Furthermore, it can be advantageous that the sliding ring has one or more, preferably two recesses, which are designed specifically as through-holes in the sliding ring. The ball nut can also have one or more grooves, which extend preferably in the axial direction of the ball nut, for at least partially receiving at least one entraining element. In a particularly preferable embodiment, the ball nut has two grooves in each of which an entraining element is positioned. The grooves can extend from one end of the ball nut in the direction of an opposite end.

Advantageously, the recesses in the sliding ring and the grooves in the ball nut can correspond to each other and the entraining element can extend though the respective recess in the sliding ring. This forms a plane in the region of the entraining element about which the ball nut can tilt relative to the bearing and thus also the belt pulley.

According to an advantageous embodiment, the entraining element can be preferably a ball or a pin and can be in contact with the inner bearing ring. The tilting of the ball nut through the selective support in the region of the entraining element can be facilitated by the curvature of the outer peripheral surface of the inner bearing ring. Tilting can also occur through an axis which runs through the opposing entraining element.

The grooves are configured as either semi-circular or square depending on the entraining elements, wherein a groove can also be provided in the inner bearing ring which has a corresponding contour. Ball nut and roller bearing are attached in a substantially rotatably fixed manner by the entraining elements.

Furthermore, the ball nut can have a revolving shoulder to counter support the sliding ring. The shoulder is arranged substantially in the region of the articulation of belt pulley and roller bearing, wherein a supporting ring is positioned preferably between the sliding ring and the shoulder, which can act as a counter flange for the inner bearing ring.

According to a further advantageous embodiment of the invention, the sliding ring can be secured on the ball nut by means of a union nut. The union nut encloses the ball nut and positions the sliding ring on the ball nut in an axial direction, wherein the sliding ring is pressed in particular against the shoulder.

According to a further embodiment, the ball nut can be tilted by between 0 and 10 degrees from a neutral position relative to the belt pulley, preferably between 1 and 7 degrees, and more preferably, between 4 and 6 degrees. Tilting by preferably 5 degrees enables sufficient clearance so that the belt lies permanently on the belt pulley and torque is transferred to the ball screw.

Provision can be made in particular that the sliding ring is mounted between two supporting rings and preferably the inner bearing ring is pretensioned by the supporting rings.

Further advantageous embodiments are disclosed in the sub-claims.

Figure 2:
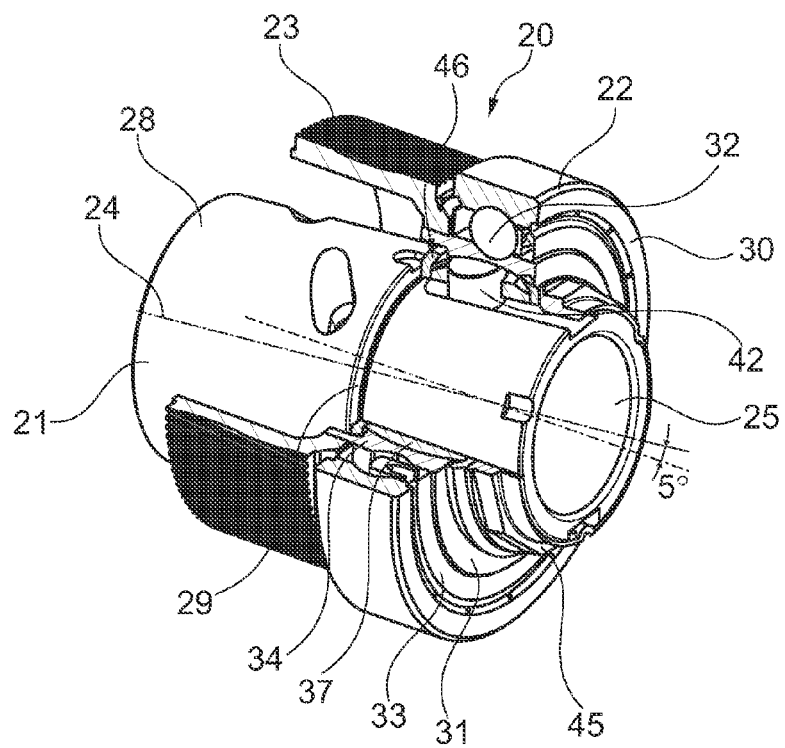
Figure 3:
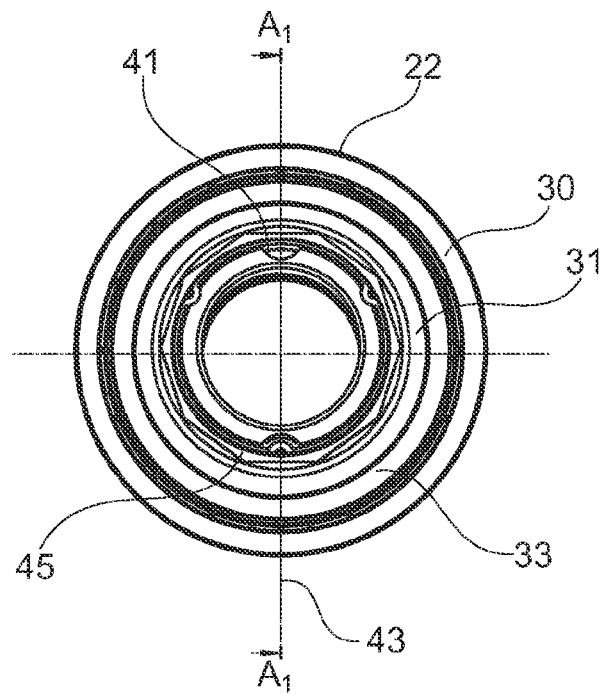
Figure 4:
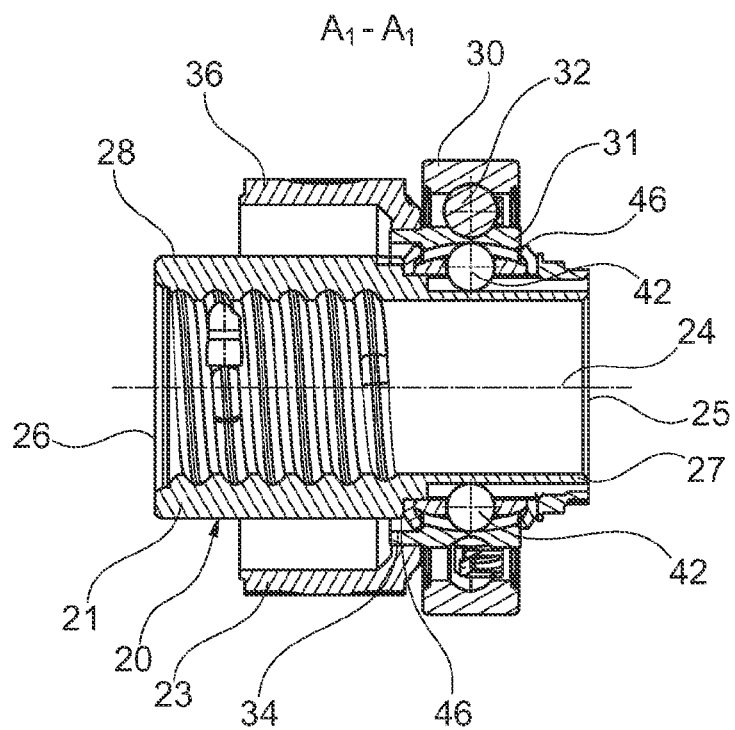
Figure 5:
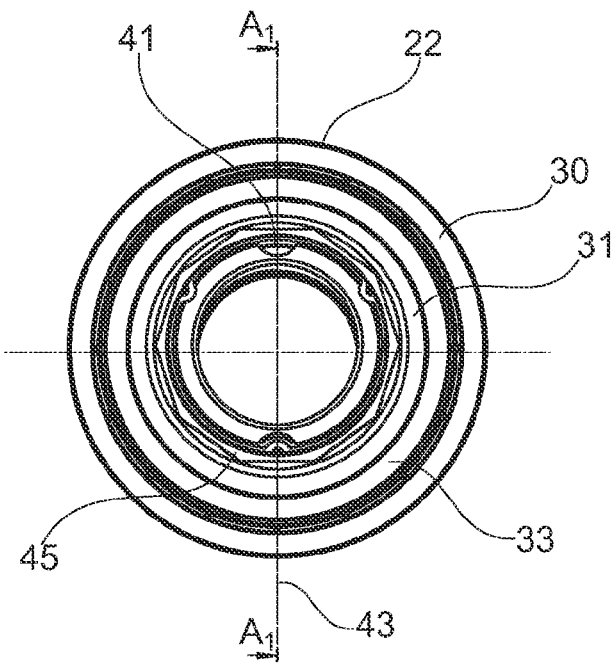
Figure 6:
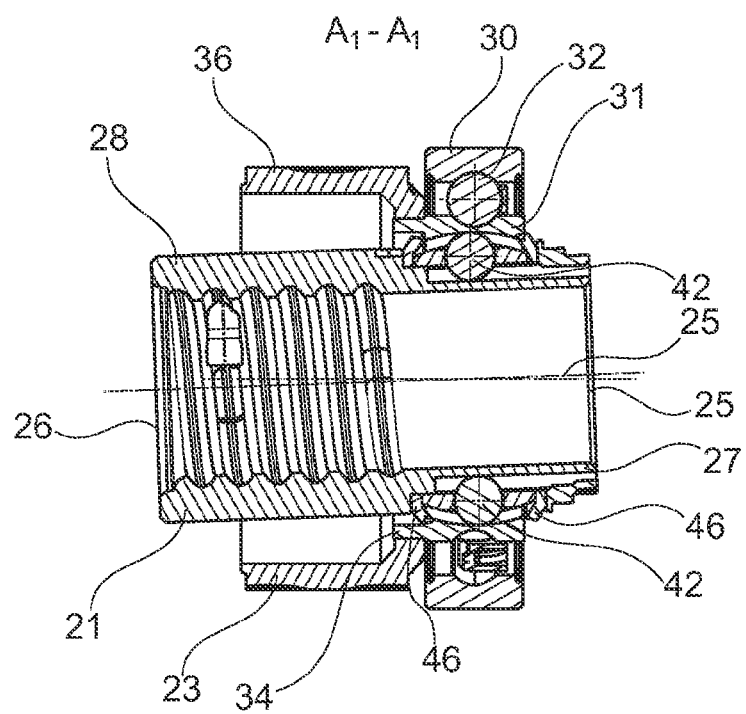
Figure 7:
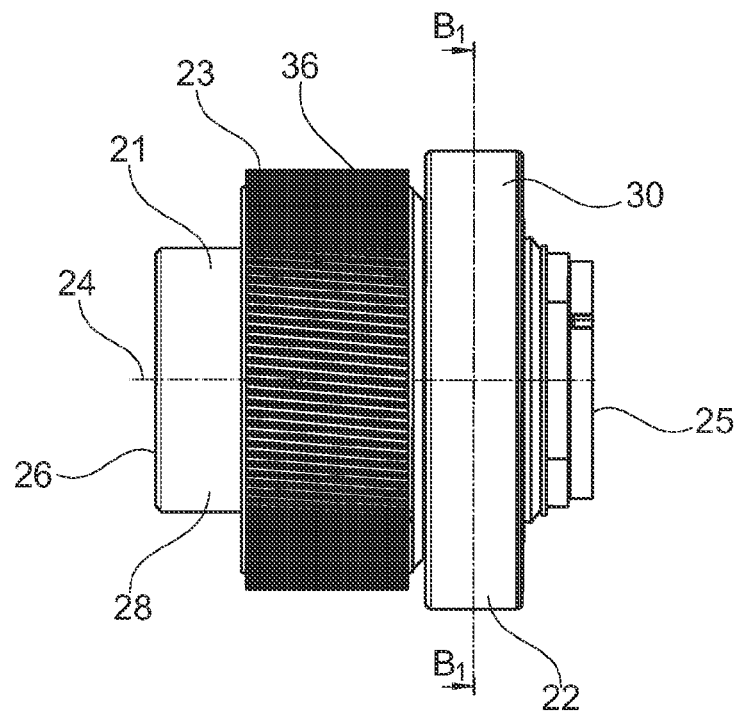
Figure 8:
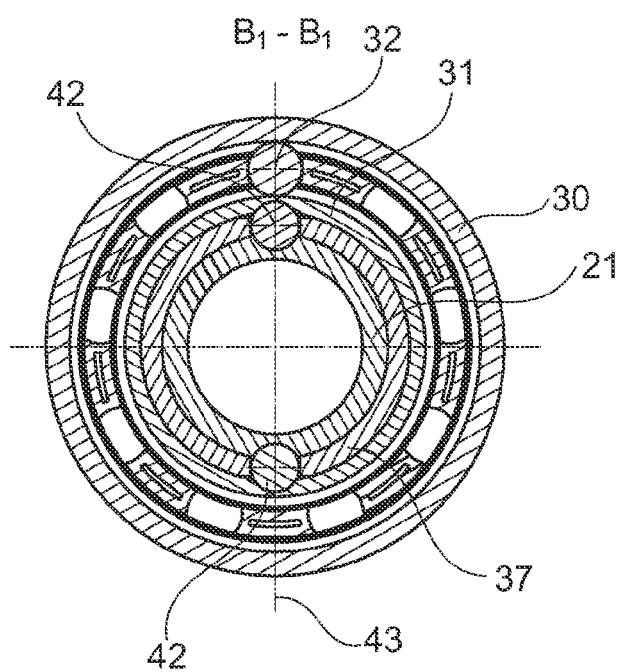
Figure 9:
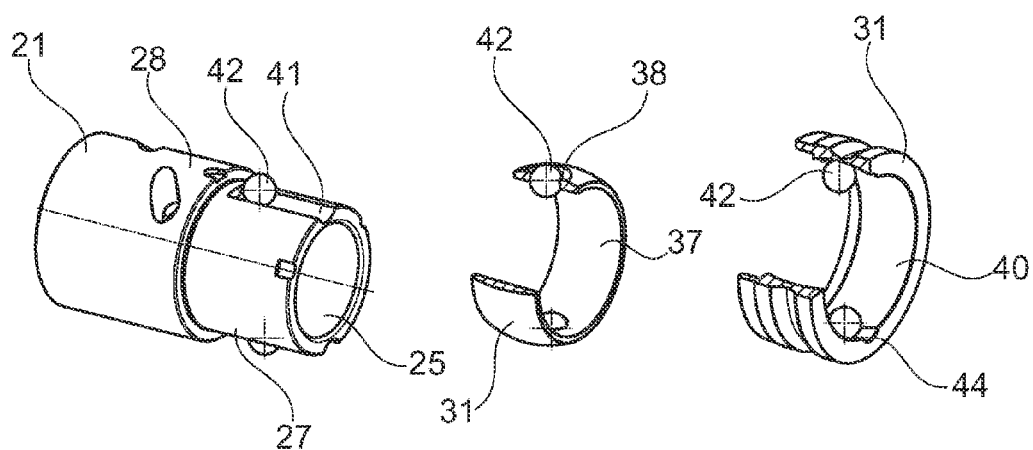
Figure 10:
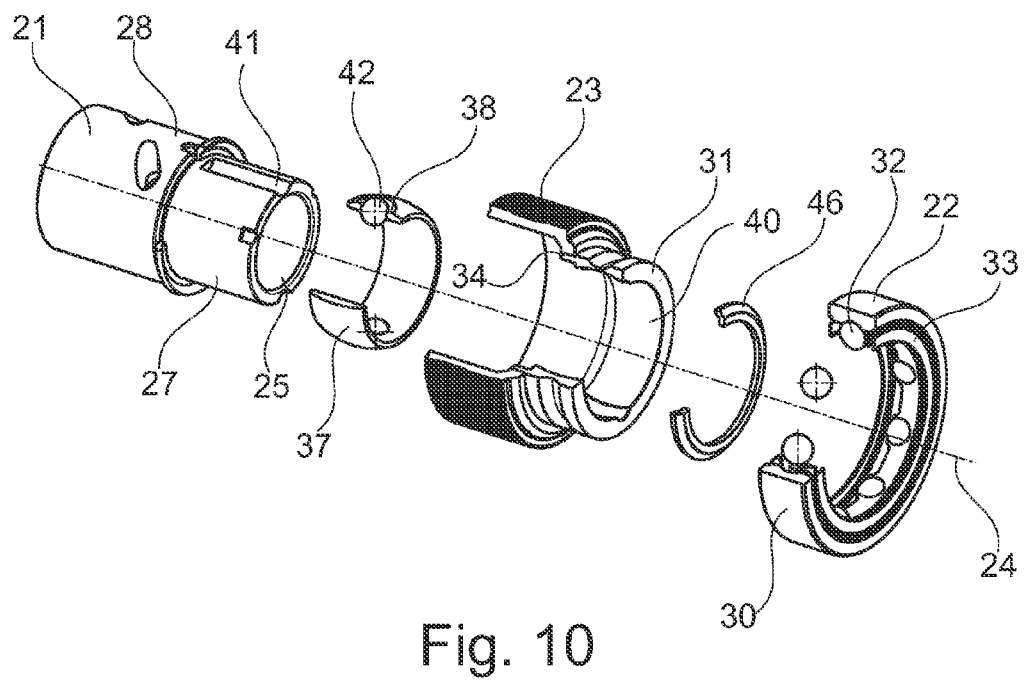

A preferred embodiment is explained in detail below using the drawings in which:

FIG. 1 is a perspective side view of a partially cut ball screw according to a first embodiment, FIG. 2 is a perspective side view of a partially cut ball screw according to a second embodiment, FIG. 3 is a front view of the ball screw according to the first embodiment in a resting position of the ball nut, FIG. 4 is a side sectional view of the ball screw according to FIG. 3 along the sectional plane A1-A1, FIG. 5 is a front view of the ball screw according to the first embodiment with the ball nut in a tilted position, FIG. 6 is a side sectional view of the ball screw according to FIG. 5 along the line of intersection A1-A1, FIG. 7 is a side view of the ball screw with roller bearing, belt pulley and ball nut, FIG. 8 is a sectional view along the sectional plane B1-B1 of FIG. 7, FIG. 9 is a exploded view of ball nut, sliding ring and inner bearing ring and FIG. 10 is an exploded view of the ball screw comprising ball nut, sliding ring, belt pulley with inner bearing ring, supporting ring and outer bearing ring.

The ball screw 20 according to the invention is shown in FIGS. 1 and 2, for example, which disclose a perspective and partially cut sectional view of the ball screw 20. The main features of the ball screw 20 are a ball nut 21, a roller bearing 22 and a belt pulley 23 linked to the roller bearing 22. The ball nut 21 is mounted in the roller bearing 22.

Electromechanical steering systems with a belt drive are generally known from the prior art. Steering systems with ball nut spindle drives are known in particular, and, for this reason, a description is not provided here, merely a more detailed explanation of the essential features of the invention.

The ball nut 21 is arranged centrally in the ball screw 20, wherein an axis 24 extends in a longitudinal direction of the ball nut 21. The ball nut 21 is hollow in order to receive a spindle (not shown) and for this reason the ball nut 21 has two open ends 25 and 26. A first region 27 adjoins the open end 25 of the ball nut 21 to which region the roller bearing 22 is assigned. Said first region 27 has a smaller external diameter than a second region 28, which substantially adjoins the other open end 26 of the ball nut 21. Thus, the second region 28 has a greater external diameter than the first region 27. A shoulder 29 is positioned at an intersection between the first and the second region 27, 28, which shoulder extends along a contour of the ball nut 21.

The ball nut 21 is mounted in the portion of the first region 27 in the roller bearing 22. The roller bearing 22 has an outer bearing ring 30 and an inner bearing ring 31. Rolling elements in the form of balls 32 are arranged between the two bearing rings 30 and 31, wherein forms other than balls 32 can be used. Furthermore, the bearing 22 has two sealing rings 33, which are arranged between both bearing rings 30 and 31 and seal off a space in which the balls 32 are arranged externally on both sides.

The inner bearing ring 31 is connected to the belt pulley 23. The inner bearing ring 31 has a projection 34 aligned in the axial direction of the bearing 22 for this purpose, to which the belt pulley 23 is linked in a rotatably fixed manner. The projection 34 of the inner bearing ring 31 protrudes at least in sections beyond the shoulder 29, wherein the belt pulley 23 is arranged on an outer peripheral surface 35 of the inner bearing ring 31. A connection between belt pulley and projection 34 is known from the prior art.

The belt pulley 23 extends from the inner bearing ring 31 in an axial direction of the ball nut 21 thus substantially covering the second region 28. The belt pulley has a structure on an outer peripheral surface 36, which increases frictional contact with a belt (not shown). The structure is configured as fluted in the embodiment for this purpose.

A sliding ring 37 is arranged between the roller bearing 22 and the ball nut 21, which sliding ring comprises the ball nut 21 in the first region 27. The sliding ring 37 rests on the first region 27 substantially as a sealing layer. Furthermore, the sliding ring 37 has two recesses in the form of through-openings 38, which are arranged opposite each other. A surface 39 of the sliding ring 37, which points to the inner bearing ring 31, is curved resulting in a convex surface 39. Said convex surface 39 corresponds to a surface 40 of the inner bearing ring 31 which is concave.

The two through-openings 38 of the sliding ring 37 correspond to respective grooves 41, which are arranged in the first region 27 of the ball nut 21. The grooves 41 are arranged in the ball nut 21 in an axial direction and extend substantially from the open end 25 to just before the shoulder 29. The grooves 41 each receive an entraining element 42, wherein a cross section of the grooves 41 is adapted to an external shape of the entraining element 42. The entraining elements 42 can have different forms. In FIG. 1, for example, the entraining element 42 is in the form of a ball, whereas the entraining element 42 in FIG. 2 is a pin. The cross section of the grooves 41 is configured to be semi-circular or square accordingly depending on the external shape of the entraining element 42.

The sliding ring 37 is arranged in the first region 27 in relation to the grooves 41 such that the two through-openings 38 are positioned over the grooves 41 as a result of which the entraining elements 42 engage at least partially with the through-openings 38. The entraining elements 42 extend through the through-openings 38 and project beyond the sliding ring 37 in the direction of the inner bearing ring 31. Thus, the entraining elements 42 are in contact with the inner bearing ring 31.

The inner bearing ring 31 rests on the entraining elements 42, as a result of which the bearing 22 is only selectively connected to the ball nut 21. On account of this selective support of the roller bearing 22, the roller bearing 22 can be tilted relative to the axis 24. The dimensions of the individual components are selected such that tilting of up to 10 degrees is possible. Preferably an angle of 5 degrees is provided as indicated in FIG. 2. The bearing 22 can be tilted either along an axis 43 running through the entraining elements 42 or at right angles to said entraining elements 42.

The rotatably fixed connection of belt pulley 23 and roller bearing 22 or inner bearing ring 31 respectively means that the belt pulley 23 can also be tilted relative to the axis 24, preferably at an angle of approximately 5 degrees. The reduction in tension referred to at the beginning can be prevented effectively by tilting the belt pulley 23, where the belt always rests completely flat on the belt pulley 23 during operation. Decoupling the belt pulley 23 from the ball nut 21 allows the rotational force exerted by an assisting engine on the ball nut 21 to be maintained permanently.

Furthermore, the inner bearing ring 31 has grooves 44 for receiving the entraining elements 42. The grooves are therefore arranged in a corresponding region on the surface 40 and also have a cross section corresponding to the cross-section of the entraining elements 42. The grooves 44 are shown in FIG. 9. The ball nut 21 is positioned in the roller bearing 22 in a rotatably fixed manner by means of the grooves. The tilting of the ball nut 21 moves the entraining elements 42 at least at times inside and in the longitudinal direction of the grooves 44. Provided the ball nut 21 only tilts about an axis running through the entraining elements 42, the entraining elements 42 remain still.

The rotating ring is attached to the ball nut 21 using an attachment means in the form of a union nut 45. The rotating ring is arranged with the entraining elements 42, which engage with the grooves 41, in the first region 27, such that the rotating ring rests at least indirectly on the shoulder 29. The rotating ring is attached to the ball nut 21 by means of the union nut 45. A supporting ring 46 is provided between the rotating ring and the shoulder 29 in the embodiment described which also includes a portion of the inner bearing ring 31. Such a supporting ring 46 is also provided between sliding ring 37 and the union nut 45.

To summarise, the invention relates to a ball screw 20 comprising a ball nut 21, a roller bearing 22 and a belt pulley 23 arranged on the roller bearing 22. The ball nut 21 is arranged in the roller bearing 22 such that there is no reduction in tension between that of the belt pulley 23 and an assisting engine arranged to the side of the ball screw 20.

What is claimed is:

1. A ball screw comprising:
   a ball nut rotatable about an axis and configured for receiving a threaded spindle arranged concentrically within the ball nut,
   a roller bearing having an outer bearing ring and an inner bearing ring, wherein the ball nut is arranged at least partially in the roller bearing,
   a sliding ring arranged between the ball nut and the inner bearing ring, wherein the sliding ring includes one or more recesses configured as through-openings in the sliding ring, and
   a belt pulley to which the inner bearing ring is connected in a rotatably fixed manner,
   wherein the ball nut is enabled to be moved in an axial or radial direction relative to the belt pulley.

2. The ball screw according to claim 1, wherein the ball nut is arranged in the roller bearing such that it is enabled to be tilted relative to the belt pulley.

3. The ball screw according to claim 1, wherein an outer peripheral surface of the inner bearing ring is configured as concave at least in part and an outer peripheral surface of the sliding ring is configured as convex at least in part, wherein both outer peripheral surfaces correspond to each other.

4. A ball screw comprising:
   a ball nut rotatable about an axis and configured for receiving a threaded spindle arranged concentrically within the ball nut,
   a roller bearing having an outer bearing ring and an inner bearing ring, wherein the ball nut is arranged at least partially in the roller bearing, and
   a belt pulley to which the inner bearing ring is connected in a rotatably fixed manner,
   wherein the ball nut is enabled to be moved in an axial and/or radial direction relative to the belt pulley, and
   wherein the ball nut includes one or more grooves extending in an axial direction of the ball nut and configured to at least partially receive at least one entraining element.

5. The ball screw according to claim 4, wherein the sliding ring includes one or more recesses, wherein the one or more recesses in the sliding ring and the grooves in the ball nut correspond to each other, and wherein the entraining element extends through the corresponding recess in the sliding ring.

6. The ball screw according to claim 4, wherein the entraining element is a ball and is in contact with the inner bearing ring.

7. The ball screw according to claim 1, wherein the ball nut includes a revolving shoulder arranged to counter support the sliding ring.

8. The ball screw according to claim 1, further comprising a union nut arranged to secure the sliding ring on the ball nut.

9. The ball screw according to claim 1, wherein the ball nut is enabled to be tilted from a neutral position relative to the belt pulley by greater than 0 and up to as much as 10 degrees.

10. The ball screw according to claim 1, further comprising two supporting rings, wherein the sliding ring is mounted between the two supporting rings.

11. The ball screw according to claim 10, wherein the inner bearing ring is pretensioned by the supporting rings.

12. The ball screw according to claim 1, wherein the ball nut is enabled to be tilted from a neutral position relative to the belt pulley by between 1 and 7 degrees.

13. A ball screw comprising:
   a ball nut rotatable about an axis and configured for receiving a threaded spindle arranged concentrically within the ball nut,
   a roller bearing having an outer bearing ring and an inner bearing ring, wherein the ball nut is arranged at least partially in the roller bearing, and
   a belt pulley to which the inner bearing ring is connected in a rotatably fixed manner,
   wherein the ball nut is enabled to be moved in an axial and/or radial direction relative to the belt pulley, and wherein the ball nut is enabled to be tilted from a neutral position relative to the belt pulley by between 4 and 6 degrees.

14. The ball screw according to claim 4, wherein the entraining element is a pin and is in contact with the inner bearing ring.

* * * * *